United States Patent [19]
LaMarca, II; Louis J. et al.

[11] Patent Number: 5,456,976
[45] Date of Patent: Oct. 10, 1995

[54] RESILIENTLY PADDED LAMINATE CONSTRUCTION AND INJECTION MOLDED THERMOPLASTIC ARTICLES FACED THEREWITH

[75] Inventors: Louis J. LaMarca, II, Hampton Falls; Paul R. Batts, Mont Vernon, both of N.H.

[73] Assignee: The Haartz Corporation, Acton, Mass.

[21] Appl. No.: 178,093

[22] Filed: Jan. 6, 1994

Related U.S. Application Data

[63] Continuation of Ser. No. 508, Jan. 5, 1993, abandoned.

[51] Int. Cl.⁶ .................... B32B 3/26; B32B 5/22
[52] U.S. Cl. .................... 428/246; 428/262; 428/317.1; 428/318.6; 428/319.7; 428/319.9; 428/254; 428/252; 428/290
[58] Field of Search .................... 428/224, 246, 428/260, 262, 304.4, 317.1, 318.4, 318.6, 318.8, 319.3, 319.7

[56] References Cited

U.S. PATENT DOCUMENTS

| | | | |
|---|---|---|---|
| 3,755,063 | 8/1973 | Massey et al. | 428/317.1 X |
| 4,330,584 | 5/1982 | Doerer | 428/91 |
| 4,565,733 | 1/1986 | Akao | 428/317.1 X |
| 4,567,091 | 1/1986 | Spector | 428/317.1 X |
| 4,764,238 | 8/1988 | Dastin et al. | 428/317.1 X |
| 4,798,756 | 1/1989 | Fukushima et al. | 428/317.1 |
| 4,806,412 | 2/1989 | Wank et al. | 428/203 |
| 4,812,186 | 3/1989 | McConnell et al. | 156/90 |
| 4,833,016 | 5/1989 | Segawa et al. | 428/317.1 |
| 5,049,439 | 9/1991 | Robinson | 428/317.1 X |

*Primary Examiner*—George F. Lesmes
*Assistant Examiner*—Blaine R. Copenheaver
*Attorney, Agent, or Firm*—Barry R. Blaker

[57] ABSTRACT

Disclosed herein is a resiliently padded laminate adapted for use as an in-mold aesthetic padded facing material for injection molded thermoplastic articles. The laminate is characterized by improved resistance to collapse of the cellular polymer padding thereof under in-mold conditions. In addition, the laminate forms a continuous thermoplastic bond with the injection molded thermoplastic article.

14 Claims, 3 Drawing Sheets

RESILIENTLY PADDED LAMINATE CONSTRUCTION AND INJECTION MOLDED THERMOPLASTIC ARTICLES FACED THEREWITH

This is a continuation of application Ser. No. 08/000508, filed on Jan. 5, 1993, now abandoned.

BACKGROUND OF THE INVENTION

The present invention relates broadly to flexible laminates having aesthetically pleasing facing layers and is more particularly concerned with a resiliently padded laminate construction suitable for use in the preparation of aesthetically faced injection molded thermoplastic articles.

Automotive interior trim articles, such as door panels, door and window pillars, armrests, instrument panels, seat backs, seat side panels, consoles, sun visors and the like typically comprise some form of shaped relatively rigid support structure having an aesthetically pleasing facing secured to at least those surfaces thereof which are exposed to the interior of the vehicle.

There has recently been developed a composite injection molding technique whereby, in a single step, a non-woven fabric facing may be secured directly to the surface of a thermoplastic support structure during injection molding thereof. In accomplishing this method a non-woven fabric facing material is first treated by needle punching so as to provide multiple sites of entry for the thermoplastic melt injected into the mold. The fabric is cut into a suitably sized and shaped facing element, the needled, non-woven fabric element placed into the female half of the mold, the mold closed, and a precise volume of a molten thermoplastic resin injected into the mold cavity under relatively low pressure of, say, less than about 1000 p.s.i., such that the molten resin fills the mold gently with an even, uniform melt front to form the support structure. In addition, the injected molten resin migrates through the back of the needled non-woven fabric facing element, filling the interstices of the fabric fibers to a predetermined uniform depth and thereby securing the non-woven fabric facing element to the surface of the injection molded thermoplastic support structure. Utilizing this process automotive trim articles comprising, for instance, a non-woven polyester fabric facing material secured to variously shaped injection molded polypropylene support structures have been successfully fabricated. Further details regarding this process can be had, for instance, by reference to the article: "New Composite Molding Method", Siebolt Hettinga, *Fiber World*, September 1992, pgs. 2, 4, 8 and 9. While the foregoing injection molding technique is capable of producing excellent quality aesthetically faced thermoplastic articles, it is possessed of certain limitations. Primarily, the method requires that a non-woven type fabric be utilized as the facing material or, at the least, that a non-woven type of fabric be employed as the backing layer in a laminate facing structure. This is so because the process inherently depends upon at least some significant migration of the injected thermoplastic resin into the interstices of the non-woven material in order to establish a mechanical keying of the material to the molded support structure.

It is often a desideratum of the industry that injection molded thermoplastic automotive trim articles be faced with an aesthetically pleasing, resiliently padded laminate, such that the surface(s) of such trim articles exposed to the vehicle occupants not only be aesthetically pleasing from a visual standpoint, but also afford a pleasing soft tactile sensation or "hand", or even significant impact energy absorption properties. To this end, facing laminates have been prepared comprising an aesthetically pleasing facing layer composed of a woven, non-woven or knit fabric or leather or an embossed or grained surface thermoplastic, an intermediate soft resilient thermoset or thermoplastic cellular polymer foam layer to confer the soft feel or "hand" to the overall construction, and a needled non-woven fabric backing layer to provide a keying surface into which an injection molded thermoplastic can migrate and secure the laminate to an injection molded support structure prepared in accordance with the relatively low pressure injection molding process outlined above. Utilizing such laminates it has been possible, on occasion, to successfully produce certain good quality injection molded automotive trim articles having at least one surface defined by an aesthetically pleasing, resiliently padded, facing laminate. However, one of the difficulties encountered in attempting to adapt such padded facing laminates and the foregoing injection molding technique to conventional injection molding production lines resides in the experience that there often occurs, in a non-uniform or unpredictable manner, localized in-mold physical collapse or degradation of portions of the intermediate cellular polymer layer of the facing laminate, thereby causing one or more visibly apparent underlying defects in the resiliently padded fabric surfaces of the resulting injection molded articles. Too, where such partial or complete collapse of portions of the polymer foam layer of the laminate occurs, there obviously also occurs in said portions a degradation of the desired soft hand or feel properties of the construction. An additional problem has also been noted where the laminate comprises an embossed or grained thermoplastic facing layer. Here, the heat and pressure experienced by the laminate in forming the support structure has resulted in a technically and aesthetically undesirable ironing or smoothing of the embossed or grained exterior surface of the facing layer. In accordance with the present invention these problems have been solved or, at the least, substantially ameliorated.

OBJECTS OF THE INVENTION

It is a principal object of the present invention to provide a novel resiliently padded laminate construction comprising an aesthetically pleasing facing layer.

It is another object of the invention to provide a resiliently padded laminate construction comprising an aesthetically pleasing facing layer, which construction is particularly suited for use as an aesthetically pleasing facing element in the preparation of injection molded thermoplastic articles.

It is still another object of the invention to provide a resiliently padded laminate construction comprising an aesthetically pleasing facing layer, which construction is particularly suited for use as an aesthetically pleasing facing element in the preparation of injection molded thermoplastic articles and wherein said laminate construction is thermoplastically bonded to at least one surface of said article during injection molding thereof.

It is another object of the invention to provide a resiliently padded laminate construction comprising an aesthetically pleasing facing layer, said laminate construction being particularly suited for use as an aesthetically pleasing facing element in the preparation of injection molded thermoplastic articles and wherein said laminate is possessed of improved resistance to degradation or collapse of the padding layer thereof during said injection molding of said article.

It is another object of the invention to provide a resiliently padded laminate construction comprising an aesthetically pleasing facing layer composed of a grained or embossed thermoplastic material, said laminate being particularly suited for use as an aesthetically pleasing facing element in the preparation of injection molded thermoplastic articles and wherein said laminate is possessed of improved resistance to smoothing and ironing of the embossed or grained surface of said facing layer during said injection molding of said article.

It is another object of the present invention to provide a novel injection molded article having a resiliently padded facing element laminate comprising an aesthetically pleasing facing layer thermoplastically bonded to at least one surface thereof.

It is still another object of the invention to provide a novel method for fabricating an injection molded thermoplastic article having a resiliently padded facing element laminate comprising an aesthetically pleasing facing layer thermoplastically bonded to at least one surface thereof.

Other objects and advantages of the present invention will, in part, be obvious and will, in part appear hereinafter.

SUMMARY OF THE INVENTION

In accordance with the invention there is provided a resiliently padded laminate construction, said laminate construction comprising (a) an aesthetically pleasing facing layer bonded to (b) a soft, resilient cellular polymer intermediate layer, which intermediate layer is, in turn, bonded to (c) a non-cellular, thermoplastic material film backing layer, said film backing layer being of a polymer composition adapted to thermoplastically bond to a heated molten thermoplastic contacted therewith in an injection mold under conditions of relatively low pressure. For purposes of the present invention the terms "thermoplastically bond", "thermoplastically bonded" or "thermoplastic bond" are intended to mean the phenomenological steps and the resulting condition whereby a previously unmelted thermoplastic polymer material is at least partially fluxed due to heat absorbed thereinto by contact thereof with another molten thermoplastic polymer material and whereby the respective contacting thermoplastic polymeric materials are sufficiently compatible such that coalescence of the molten thermoplastic polymer material with the fluxed thermoplastic polymer material occurs to the extent that a secure and continuous bond is achieved between the contacting surfaces of said materials upon cooling thereof to below their respective melting points. The injection molded thermoplastic article of the invention comprises an injection molded thermoplastic support element and a facing element composed of the resiliently padded laminate construction of the invention, at least one surface of said support element being thermoplastically bonded to the thermoplastic film backing layer of said facing element. The method for fabricating such injection molded thermoplastic articles comprises providing a facing element composed of the resiliently padded laminate construction of the invention, positioning said facing element in an open injection mold with the thermoplastic film backing layer thereof oriented towards the sprue of the mold, closing the mold, injecting a charge of heated molten thermoplastic polymer through said sprue and into said closed mold containing said facing element positioned therein under relatively low pressure and in an amount sufficient to fill the mold and to thereby form said support element, said molten thermoplastic polymer charge having sufficient heat therein as to thermoplastically bond said charge to said thermoplastic film backing layer of said facing element, cooling the resulting molded thermoplastic support element within the mold to a form stable state, opening the mold and removing from said mold the resulting composite injection molded article having said facing element thermoplastically bonded to at least one surface of said support element.

DESCRIPTION OF PREFERRED EMBODIMENTS

Figure 1:
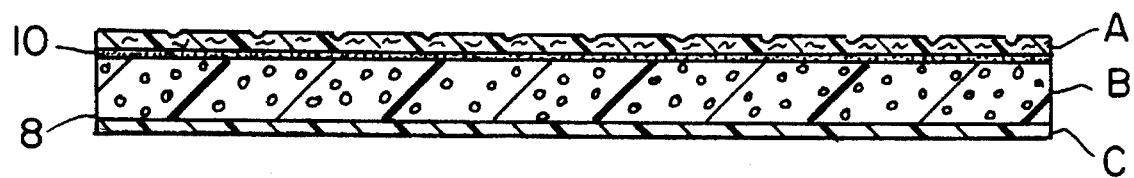
FIG. 1 is a cross sectional view of one embodiment of the resiliently padded laminate construction of the invention.
Figure 2:
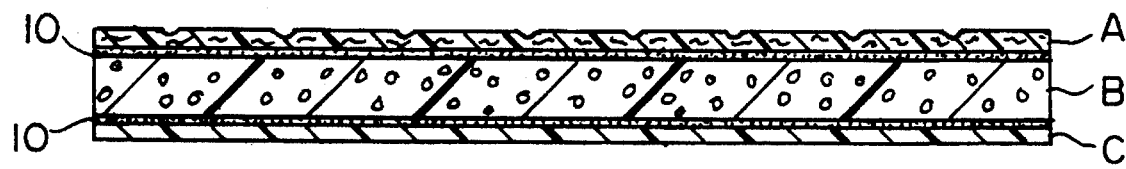
FIG. 2 is a cross sectional view of another embodiment of the resiliently padded laminate construction of the invention.
Figure 3:
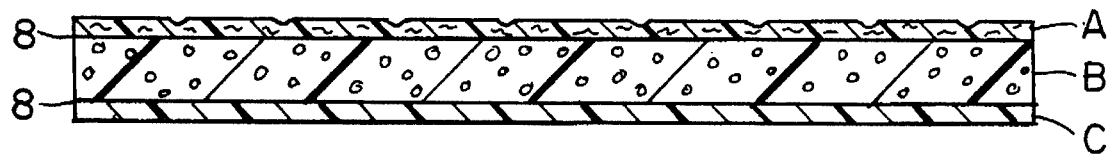
FIG. 3 is a cross sectional view of still another embodiment of the resiliently padded laminate construction of the invention.

Referring now particularly to FIGS. 1 through 3, wherein like reference numerals and letters refer to like structures, the resiliently padded laminate construction of the present invention broadly comprises three essential layers, namely, an aesthetically pleasing facing layer A, a soft, resilient cellular polymer intermediate layer B and a non-cellular thermoplastic film backing layer C. The facing layer A, whose principal function is to lend a pleasing aesthetic appearance to the overall construction, can comprise a woven, non-woven or knitted textile composed of synthetic and/or natural fibers such as polyesters, polyamides, viscose or acetate rayons, spandex polyurethanes, polyolefins such as polyethylene, polypropylene and copolymers thereof, cotton, wool, and blends of the foregoing fibers. Where the facing layer is a textile of woven construction, it can have any aesthetically attractive weave, such as in the nature of a tightly woven tricot or a velour. Alternatively, the facing layer A of the resiliently padded laminate construction of the invention can also comprise natural leather or an attractively surface embossed or grained synthetic polymer material in sheet or film form, such as: polyvinylchloride and copolymers thereof; polyurethanes; acrylics; polyolefins; thermoplastic polyolefins (TPO); thermoplastic polymer blends and alloys; thermoplastic elastomers (TPE) and rubbers (TPR); styrene-butadiene-styrene; and the like. Where a grained or embossed polymer film or sheet material is employed for the facing layer A, we generally prefer that it be composed of an at least partially externally plasticized polyvinylchloride resin which is generally characterized by excellent surface abrasion and cut resistance, or of a polyolefinic polymer, particularly homopolymers, copolymers, blends and alloys of polypropylene, which largely avoids the problem of external plasticizer migration and volatilization. While not specifically shown, if desired, the facing layer A of the resiliently padded laminate construction of the invention can also comprise a composite structure composed of one or more elements of a woven, non-woven or knitted textile and/or of one or more elements of polymer sheet or film, said elements being secured to one another in an edgewise manner, such by stitching or adhesive bonding thereof.

The soft, resilient cellular polymer intermediate layer B, which may be of open, closed or reticulated cell construction, has a thickness of at least about 1 mm and is composed of a synthetic or natural thermosetting or thermoplastic cellular polymer such as polyurethane, polyvinylchloride/nitrile, polyethylene, polypropylene, polyethylene/polypropylene blends and copolymers. In general, we prefer polyurethane or polyolefinic cellular materials for the intermediate layer B, particularly closed cell polyolefins, and, even more particularly, those polyolefinic cellular materials which have been at least lightly crosslinked. We have found crosslinked cellular polypropylene and polyethylene/polypropylene blends and copolymers to constitute a generally excellent choice of material for the intermediate layer B.

The film backing layer C of the resiliently padded laminate construction of the invention is a non-cellular, homogeneous flexible polymeric film having a thickness within the range of from about 0.254 mm to about 0.762 mm and may be composed of substantially any flexible thermoplastic polymer which is sufficiently compatible with the injection molding resin to be employed in preparing the injection molded articles of the invention as to form a thermoplastic bond therebetween. Generally suitable polymers for the film backing layer C are, for instance, acrylonitrile-butadiene-styrene (ABS), polyolefins, TPO, TPE, ABS/polycarbonate blends and the like. In accordance with a preferred embodiment of the invention, the homogeneous film backing layer C is composed of a thermoplastic polyolefin (TPO). Homopolymers, copolymers, blends and alloys of polypropylene, have been found to constitute excellent materials of construction for the film backing layer C, particularly when the injection molded support element for the finished article is itself composed of polypropylene.

The homogeneous thermoplastic film backing layer C of the resiliently padded laminate construction of the invention constitutes a marked departure from the non-woven fabric backing materials utilized in the aesthetic facings of the previously described prior art relatively low pressure injection molding process wherein such non-woven and needled fabrics are necessarily utilized for purposes of attaining a mechanical "keying" or partial impregnation of the injected polymer melt into the needled, non-woven fabric backing material. In the resiliently padded laminate construction of the present invention the non-cellular film backing layer C, unlike the non-woven fabrics employed in the prior art process, apparently and surprisingly functions as an effective thermal barrier to the molten thermoplastic charge injected into the mold and prevents, to a significant extent, thermal degradation or thermally spawned collapse of the cellular structure of the soft, resilient intermediate cellular polymer layer B under the relatively low pressure conditions existing within the injection mold. Said protection also appears to extend significantly to the facing layer A of the laminate construction, particularly where said facing layer A takes the form of a surface embossed or grained thermoplastic sheet material subject to deleterious ironing or smoothing of its surface when pressed against the surface of the injection mold under the thermal and pressure conditions achieved therein during injection molding of the support element. In addition, the non-cellular thermoplastic film backing layer C of the laminate of the present invention forms a continuous thermoplastic bond with the molten thermoplastic injected into the mold, not merely a mechanical "keying" of the injected polymer charge into a fibrous substrate. Accordingly, even if certain of the resiliently padded laminates comprising non-woven fabric backing layers can be successfully utilized in the relatively low pressure injection molding method of the prior art without the unpredictable collapses of the cellular polymer layer previously mentioned, the improved thermal and/or pressure tolerances exhibited by the resiliently padded laminates of the present invention hold out the promise for allowing increased injection molding melt temperatures and/or pressures in order to decrease mold cycle times and to thereby improve productivity and/or process economics.

The overall thickness of the resiliently padded laminates of the invention can vary substantially and will depend upon such parameters as the inherent flexibility of each of the layers of the laminate including, where present, the adhesive layers, the depth of draw and the sharpness of the mold radii to be accomodated by a facing element prepared from the laminate during the subsequent injection molding of the support element therebehind and the like. Obviously, the more flexible the resiliently padded laminate, the greater can be the thickness thereof for use as a facing element in a mold of given geometry and size. In general, it can be said that the overall thickness of the resiliently padded facing laminate of the invention should not ordinarily exceed about 50 mm and will generally reside within the range of from about 1.5 mm to about 5.0 mm.

The respective layers of the resiliently padded laminate construction of the invention can be bonded to one another adhesively, such as by flexible adhesive layers 10 interposed between layers A and B of the embodiment shown in FIG. 1 or layers A, B and C of the embodiment shown in FIG. 2 or, where the contacting layers of the laminate are of sufficiently compatible composition as to be capable of thermoplastic bonding, said layers may be so thermoplastically and continuously bonded, such as is shown at 8 between layers B and C of the embodiment of FIG. 1 or as shown between the layers A, B and C in the embodiment of the invention shown in FIG. 3.

Figure 4:
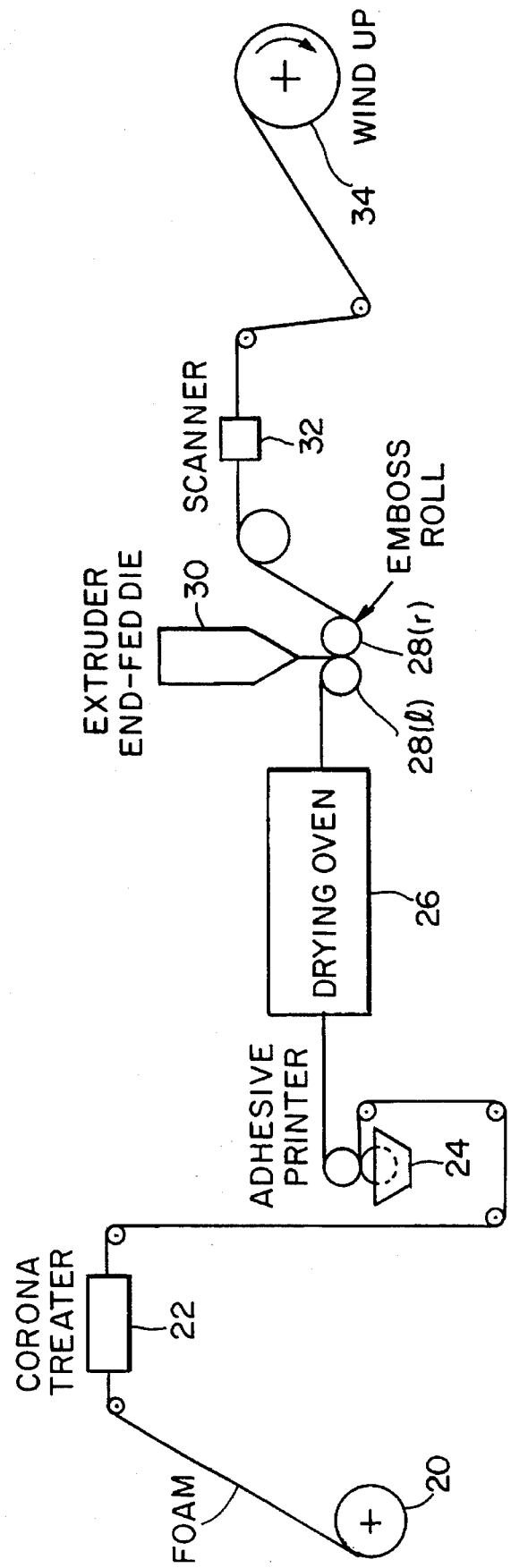
FIG. 4 is a diagrammatic, schematic flow sheet depicting one exemplary method for laminating adjacent layers of the resiliently padded laminate construction of the invention by adhesive bonding thereof.

FIG. 4 schematically depicts one suitable process scheme for preparing an embossed polyvinylchloride facing layer and for adhesively bonding said facing layer to a polyolefinic foam intermediate layer. The resilient foam sheet is supplied from feed reel 20 and is conducted through a corona discharge treater 22 wherein the surface of the foam sheet is treated or "primed" so as to more effectively bond with the adhesive to be applied thereto. Such surface treatment is conventional in the art and various alternatives, such as ultraviolet treatment, may be substituted therefor. Next, an adhesive, such as an acrylic or polyurethane latex adhesive, is applied to the upper surface of the foam sheet, such as by means of a gravure adhesive printer 24. The foam sheet is then conveyed through a drying oven 26 in order to drive off the adhesive solvent or liquid carrier. Thus, the upper surface of the foam sheet exiting the drying oven 26 is prepared to adhesively accept and bond to the facing layer of the laminate. The adhesive coated foam sheet is conducted through the nip of a pair of chilled rolls 28(*l*) and 28(*r*). The facing layer of the laminate construction is prepared by extrusion of a sheet of polyvinylchloride by means of an extruder 30, comprising an end-fed die, which is stationed directly over the nip of the rolls 28(*l*) and 28(*r*) so as to discharge its sheet form extrudate directly onto the adhesively coated surface of the sheet foam. The rolls 28(*l*) and 28(*r*) function to uniformly apply the facing layer onto the adhesive coated foam sheet and to cool the extrudate facing layer. Additionally, the surface of the roll 28(*r*) is engraved with an aesthetically pleasing pattern or grain thereby to function as an embossing roll whereby said pattern or grain is embossed into the exterior surface of the hot, semi-solid polyvinylchloride sheet extrudate as it passes, along with the adhesive coated foam sheet, through the nip defined by the rolls 28(*l*) and 28(*r*). The resulting facing layer/foam sheet laminate passes from the nip defined between the rolls 28(*l*) and 28(*r*) through a scanner 32 which continuously monitors the density of the laminate passing therethrough. Such scanners are usually operatively integrated with the extruder 30 and/or wind up roll 34 so as to control the speed(s) thereof and to thereby provide a finished intermediate laminate product of uniform density. After passing through the scanner 32 the facing layer/foam sheet laminate intermediate product is received on wind up roll 34 for further conventional treatment, if desired, and for subsequent fabrication into the finished resiliently padded laminate construction of the invention. For instance, where the aesthetic facing layer of the intermedate laminate product is an embossed polyvinylchloride sheet or film, as specifically shown, the intermediate laminate product may be unrolled from the wind up roll 34 and the aesthetic facing layer thereof further treated, such as by top coating thereof with conventional color correcting and/or abrasion resistant coatings.

Where the aesthetic facing layer is in the nature of a pre-formed woven, non-woven or knitted textile, leather, or a synthetic polymer sheet or film material, the process scheme shown in FIG. 4 can be modified by removing the extruder 30 and substituting therefor a feed roll containing the pre-formed aesthetic facing layer thereon. Additionally, of course, the rolls 28(*l*) and 28(*r*) need not be chilled and the roll 28(*r*) is not engraved or utilized as an embossing roll. Instead, the nip defined between the rolls 28(*l*) and 28(*r*) simply serves to uniformly and smoothly apply the pre-formed aesthetic facing material received from its feed roll to the adhesive coated surface of the intermediate foam layer. As will be appreciated, this modified scheme can also be utilized to adhesively bond a preformed thermoplastic backing layer to the intermediate resilient cellular polymer layer of the intermediate laminate product, thereby to complete the resiliently padded laminate construction of the invention. However, it is normally preferred that the thermoplastic backing layer be thermoplastically bonded to the soft, resilient cellular polymer layer and, in FIG. 5, there is shown a process scheme whereby a polyolefinic thermoplastic backing layer material is extrusion coated directly onto the free remaining surface of the cellular polymer layer of the aesthetic facing layer/cellular polymer laminate product arising from the process scheme of FIG. 4.

Figure 5:
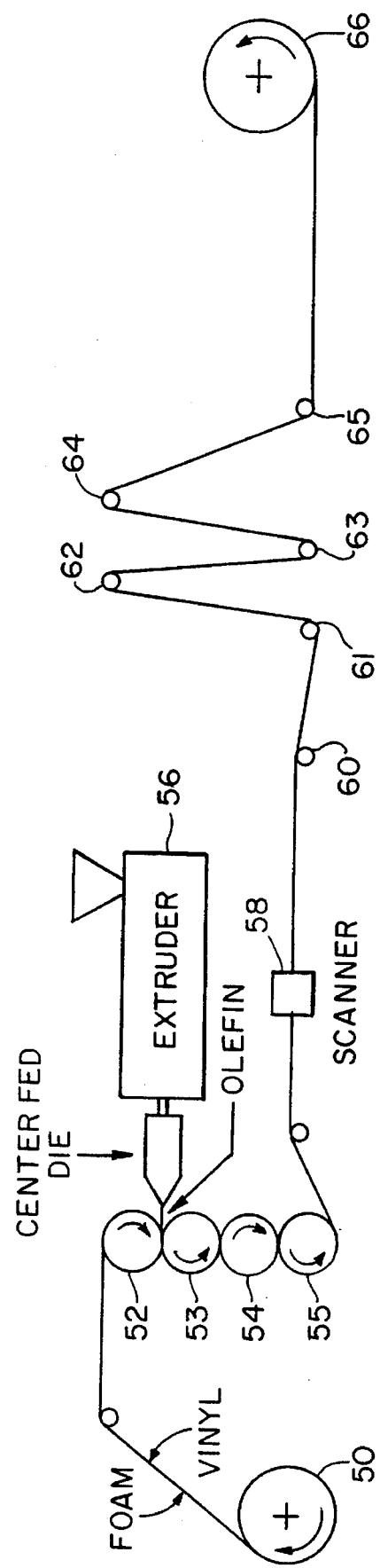
FIG. 5 is a diagrammatic, schematic flow sheet depicting one exemplary method for laminating adjacent layers of the resiliently padded laminate construction of the invention by an extrusion coating technique.

Referring now to FIG. 5, the intermediate laminate product of FIG. 4 is taken from a storage reel 50 with the foam layer thereof oriented upwardly. This intermediate laminate product is conducted over the uppermost of a plurality of vertically ganged chill rolls 52–54 and then reeved serially and downwardly through the separate nips defined therebetween. A thermoplastic polyolefinic resin is extruded into a film form extrudate by means of extruder 56, the die of said extruder 56 being positioned so as to direct its molten film form extrudate into the nip defined between the uppermost pair of chill rolls 52, 53. By so contacting the fresh hot film form extrudate with the polyolefinic foam layer of the intermediate laminate product and by substantially immediately thereafter cooling the resulting overall laminate contruction by means of the chill rolls 53–55, the resulting extruded polyolefin backing layer film is thermoplastically bonded to the polyolefinic foam layer, thereby completing the resiliently padded laminate construction of the invention.

Said completed laminate construction is passed from the last chill roll 55 through a scanner 58, such as has been previously described, thence through a gang of take-up or idler rolls 60–65 and, finally, to a wind up or storage roll 66.

In utilizing the resiliently padded laminates of the invention as aesthetically pleasing facing elements for injection molded wares said laminate is first cut into an appropriately sized and shaped facing element for providing the desired surface coverage of the injection molded article to be prepared therewith. In many cases, such as when the facing element is intended to wrap around one or more edges of the support element to be molded, it may be desirable to provide the facing element laminae in a size and shape such that it bridges the entire mold cavity and is thus continuously engaged and trapped between the parting lines of the mold halves upon closure thereof. The prepared facing element laminate is then positioned within or over, as the case may be, an open injection mold half, with the thermoplastic film backing layer thereof being oriented toward the gate or sprue of the mold. After suitable positioning of the facing element laminate the mold halves are closed and an injection molding grade of a thermoplastic polymer of a type which is sufficiently compatible with the polymer composition of the thermoplastic film backing layer of the facing element laminate as to thermoplastically bond thereto is injected into the mold as a heated molten charge thereof under relatively low pressure, the volume of said injection molded charge being at least sufficient to form the entirety of the support element for the finished article. Where the article to be prepared involves deep drawing of the facing element laminate, or involves sharp radii to be negotiated thereby, it may be found desirable to assist the facing element laminate into conformity with the surface of the mold cavity by vacuum aided forming of said facing element laminate into the mold cavity. This vacuum aided forming step for the facing element laminate, which is optional, can be accomplished prior to closing of the mold, subsequent thereto or even during injection of the thermoplastic material into the injection mold to form the support element for the finished article.

Suitable injection molding grade thermoplastic polymers for forming the support elements of the aesthetically faced injection molded articles of the invention will generally be obvious to those of skill in the art. The selection of the injection molding grade polymer will, of course, involve such considerations as the strength and other physical property needs of the finished injection molded article and the compatability of the polymer with the thermoplastic backing layer of the resiliently padded laminate of the invention. Exemplary injection molding grade polymers for use in the invention are: ABS, polyolefins, polypropylene copolymers, TPOs and TPEs. Of the these, rubber modified styrene polymers, such as ABS, and the olefinic polymers, particularly polypropylene and its copolymers and blends thereof with other olefins, are preferred.

The injection molding grade polymers outlined above can, if desired, be compounded with the usual adjuvants conventionally employed in the preparation of injection molded wares such as pigments, stabilizers, extender and/or reinforcing fillers such as talc, fumed silica, carbon black or glass fiber, dyes, colorants and the like. In particular, the present invention also contemplates the use of injection molding grade thermoplastic polymers for fabricating the injection molded support elements which have been compounded with appropriate blowing agents such that there results from the injection molding step a cellular support element of substantially lesser weight than would otherwise arise from the use of a non-cell forming thermoplastic composition.

After injection of the thermoplastic polyer to form the support element and to set into motion the formation of the thermoplastic bond thereof with the compatible thermoplastic backing layer of the facing element laminate, the mold is cooled sufficiently for the molded article to attain a form stable state, the mold opened, and the formed and aesthetically faced article removed therefrom for the usual finishing operations conventionally encountered in the fabrication of injection molded articles, such as deflashing, trimming of the runners and sprue slugs, drilling of the article to receive fasteners therethrough and the like.

It is, of course, highly desirable that the waste material arising from an injection molding or component assembly operation be of a type such that it may be readily recycled. Additionally, the automotive industry has, in general, undertaken a concerted effort to design polymeric vehicle parts with a view towards providing parts which, upon scrapping of the vehicle at the end of its service life, may be recovered and recycled. To these ends, therefore, we prefer that each of the layers A, B, C of the resiliently padded facing element laminate of the invention be composed of polymeric materials belonging to the same genus. It is further preferred that the adjacent layers of said facing element laminate each be thermoplastically, rather than adhesively, bonded together. It is yet further preferred that the injection molding grade thermoplastic polymer utilized to form the support element for the article fall within the same genus as the polymers utilized for the layers A, B, C of the resiliently padded laminate facing element of the invention. Where these design parameters are met, the waste material arising from the injection molding operation, including the above-mentioned sprue slugs, flash, runners and trimmings and turnings, as well as entire off-quality or recovered scrapped articles, can generally be simply and readily recycled by grinding and blending of the reground material, usually in an amount of up to about 20 percent, by weight, with at least about 80 percent, by weight, of virgin injection molding grade thermoplastic polymer. Polymeric species residing within the genus of polyolefins, including copolymers with other monomers, blends and rubber-modified alloys thereof, can usually be readily selected for the specific properties required to adequately serve the needs of each of the layers of the resiliently padded laminate facing elements of the invention and of the injection molded support elements therefor. Accordingly, from the standpoint of facilitating the recycle of waste materials, it is our preference that the layer elements of the laminates of the invention and the injection molding grade polymer utilized to fabricate the support element of the article each be in the nature of a polyolefin.

While the foregoing description demonstrates certain embodiments of the invention and techniques for implementation and use thereof, it should be recognized and understood that said description is not to be construed as limiting of the invention because many obvious changes, modifications and variations may be made without departing from the essential scope, spirit or intention of the invention. For instance, while the invention has been described with particular reference to the fabrication of automotive interior trim articles, it is obvious that many other useful articles residing outside the field of automotive use can be prepared utilizing the aesthetically faced, resiliently padded laminates of the invention. For example, the present invention is also clearly applicable to the preparation of aircraft or marine vessel trim articles as well as such diverse items as upholstered wares, luggage, decorative and functional cabinet and furniture components and the like. Accordingly, it is intended that the invention is to be limited only by the scope of the appended claims.

What is claimed is:

1. A flexible resiliently padded laminate in sheet form suitable for use as a facing material for the fabrication of injection molded articles having at least one soft, aesthetically pleasing padded surface and exhibiting enhanced resistance to degradation under injection molding conditions, said laminate consisting of the following discrete elements:

(a) an aesthetically pleasing facing layer composed of a polymer film or textile material bonded to;

(b) a soft resilient cellular polyolefin intermediate layer, said intermediate cellular layer being, in turn, bonded to;

(c) a homogeneous non-cellular thermoplastic polyolefin film backing layer;

whereby said thermoplastic polyolefin film backing layer of said padded laminate is thermoplastically bondable directly to a compatible injection molding grade of a thermoplastic polymer melt injected into an injection mold containing said laminate therein and whereby said thermoplastic polyolefin film backing layer further confers enhanced resistance of said padded laminate to degradation during contact thereof with said melt under injection molding conditions.

2. The laminate of claim 1 wherein said aesthetically pleasing facing layer is textile selected from the group consisting of woven, non-woven and knitted fabrics.

3. The laminate of claim 2 wherein said textile is composed of a polyolefin.

4. The laminate of claim 1 wherein said aesthetically pleasing facing layer is a polymer material film having an aesthetically pleasing embossed surface.

5. The laminate of claim 4 wherein said polymer material is a thermoplastic.

6. The laminate of claim 5 wherein said polymer material is a plasticized polyvinylchloride.

7. The laminate of claim 5 wherein said polymer material is a polyolefin.

8. The laminate of claim 7 wherein said polyolefin is selected from the group consisting of homopolymers, copolymers, blends and alloys of polypropylene.

9. The laminate of claim 1 wherein said cellular polyolefin intermediate layer is crosslinked.

10. The laminate of claim 1 wherein said non-cellular thermoplastic polyolefin film backing layer is selected from the group consisting of homopolymers, copolymers, blends and alloys of polypropylene.

11. The laminate of claim 1 wherein said facing layer of (a) is thermoplastically bonded to said cellular intermediate layer of (b).

12. The laminate of claim 1 wherein said facing layer of (a) is adhesively bonded to said cellular intermediate layer of (b).

13. The laminate of claim 1 wherein said cellular intermediate layer of (b) is thermoplastically bonded to said backing layer of (c).

14. The laminate of claim 1 wherein said facing layer of (a) is thermoplastically bonded to said cellular intermediate layer of (b) and wherein said cellular intermediate layer of (b) is thermoplastically bonded to said backing layer of (c).

* * * * *

REEXAMINATION CERTIFICATE (3562nd)

United States Patent [19]

LaMarca, II et al.

[11] B1 5,456,976

[45] Certificate Issued Jun. 30, 1998

[54] RESILIENTLY PADDED LAMINATE CONSTRUCTION AND INJECTION MOLDED THERMOPLASTIC ARTICLES FACED THEREWITH

[75] Inventors: Louis J. LaMarca, II, Hampton Falls; Paul R. Batts, Mont Vernon, both of N.H.

[73] Assignee: The Haartz Corporation, Acton, Mass.

Reexamination Requests:
No. 90/004,634, May 15, 1997
No. 90/004,725, Aug. 5, 1997

Reexamination Certificate for:
Patent No.: 5,456,976
Issued: Oct. 10, 1995
Appl. No.: 178,093
Filed: Jan. 6, 1994

Related U.S. Application Data

[63] Continuation of Ser. No. 508, Jan. 5, 1993, abandoned.

[51] Int. Cl.$^6$ ............... B32B 3/26; B32B 5/22

[52] U.S. Cl. ............... 442/221; 428/317.1; 428/318.6; 428/319.7; 428/319.9; 442/226; 442/315; 442/370; 442/374

[58] Field of Search ............... 428/317.1, 318.6, 428/319.7, 319.9; 442/221, 226, 315, 370, 374

[56] References Cited

FOREIGN PATENT DOCUMENTS

| | | |
|---|---|---|
| 61-14944 | 1/1986 | Japan . |
| 61-107529 | 7/1986 | Japan . |
| 2-58100 | 9/1987 | Japan . |
| 2-47022 | 2/1990 | Japan . |
| 3-162914 | 7/1991 | Japan . |

*Primary Examiner*—Marion E. McCamish

[57] ABSTRACT

Disclosed herein is a resiliently padded laminate adapted for use as an in-mold aesthetic padded facing material for injection molded thermoplastic articles. The laminate is characterized by improved resistance to collapse of the cellular polymer padding thereof under in-mold conditions. In addition, the laminate forms a continuous thermoplastic bond with the injection molded thermoplastic article.

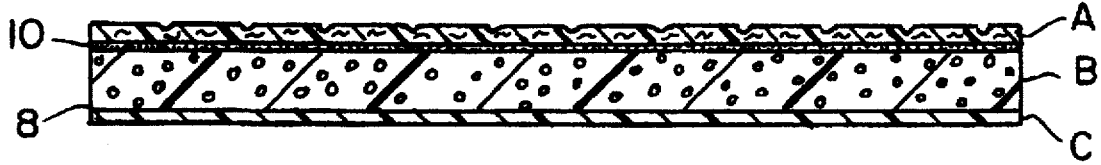

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–14 are cancelled.

* * * * *